United States Patent [19]

Ishikawa et al.

[11] Patent Number: 5,035,478
[45] Date of Patent: Jul. 30, 1991

[54] MATERIAL FOR MICRO OPTICAL COMPONENT AND OPTICAL COMPONENT USING THE SAME

[75] Inventors: Akira Ishikawa, Kokubunji; Yukio Ito, Sayama; Hiroshi Okamoto, Oume; Tetsuichi Kudo, Tokyo; Katsuki Miyauchi, Hino, all of Japan

[73] Assignee: Hitachi, Ltd., Tokyo, Japan

[21] Appl. No.: 567,706

[22] Filed: Aug. 14, 1990

Related U.S. Application Data

[63] Continuation of Ser. No. 93,629, Sep. 8, 1987, abandoned.

[30] Foreign Application Priority Data

Sep. 8, 1986 [JP] Japan .................. 61-209449

[51] Int. Cl.$^5$ .................. G02F 1/17; G02F 1/23; C09K 3/00
[52] U.S. Cl. .................. 350/96.12; 350/96.34; 350/356; 350/357; 350/409; 350/286; 252/186.43; 252/582; 252/584; 252/600; 423/415 R; 423/582; 423/584; 423/606
[58] Field of Search .................. 252/186.43, 582, 584, 252/600; 350/96.12, 96.34, 286, 356, 357, 409; 423/415, 582, 584, 606

[56] References Cited

U.S. PATENT DOCUMENTS

| | | | |
|---|---|---|---|
| 2,895,892 | 7/1959 | Chalkley | 252/186.43 |
| 3,451,764 | 6/1969 | MacWilliams | 423/606 X |
| 3,859,373 | 1/1975 | Seitzer | 423/606 X |
| 4,116,859 | 9/1978 | Merkl | 252/186.43 |
| 4,272,164 | 6/1981 | Trussell, Jr. | 350/357 |
| 4,325,611 | 4/1982 | Huggins et al. | 252/600 |
| 4,338,000 | 7/1982 | Kamimori et al. | 252/600 |
| 4,339,424 | 7/1982 | Jacobsen et al. | 423/606 |
| 4,345,982 | 8/1982 | Ikawa et al. | 204/129 |
| 4,483,997 | 11/1984 | McEntire et al. | 549/529 |
| 4,522,934 | 6/1985 | Shum | 502/210 |
| 4,533,527 | 8/1985 | Farrell et al. | 423/53 |
| 4,634,585 | 1/1987 | Kudo et al. | 423/606 X |

FOREIGN PATENT DOCUMENTS

| | | | |
|---|---|---|---|
| 2759117 | 7/1979 | Fed. Rep. of Germany | 423/606 |
| 60-251130 | 12/1985 | Japan | 423/606 |

OTHER PUBLICATIONS

Heslop, Inorg. Chem. Elsevier Publ. Co., pp. 448-449, 1960.
Kirk-Othmer Encyclopedia of Chemical Technology, 3rd Ed., vol. 17, 1982, pp. 20-21.
Bailar, Comphrehensive Inorg. Chemistry, Pergamon Press, p. 769, 1974.

*Primary Examiner*—Catherine S. Kilby Scalzo
*Attorney, Agent, or Firm*—Antonelli, Terry, Stout & Kraus

[57] ABSTRACT

A material for an optical component comprising polytungstic acid having peroxo groups, and an optical component, at least part of which is constituted of a thin film of the above-mentioned material. By using this material, a thin film of an inorganic material having an excellent stability is formed by the inexpensive wet painting method. An optical component using the above-mentioned thin film can be formed on an arbitrary substrate with high accuracy at a low temperature of about 100° C. or below. The polytungstic acid may contain carbon as a heteroatom and/or may have Nb, Ti, V, Ta and/or Mo substituted for part of W.

39 Claims, 1 Drawing Sheet

MATERIAL FOR MICRO OPTICAL COMPONENT AND OPTICAL COMPONENT USING THE SAME

This application is a File Wraper continuing application of application Ser. No. 07/093,629, filed Sept. 8, 1987.

BACKGROUND OF THE INVENTION

The present invention relates to an optical material suitable for micro optical components such as a thin-film wave guide, a micro lens, a micro prism, etc. used in an optical integrated circuit or the like, and an optical component using the same.

Materials for a lens, a prism, or a thin-film wave guide, which have heretofore been used, include LiNbO$_3$ having Ti, V, or Ni diffused therein (see R. V. Schmit and I. P. Kaminow, Appl. Phys. Letts, 25 (1974), 458), ZnO deposited by sputtering (see P. K. Tien, Appl. Opt. 10 (1971), 2395) and polymethyl methacrylate. In the case of an inorganic material, the technique concerning the above-mentioned conventional materials requires a vacuum technique such as evaporation or sputtering for formation of a thin film and a micro pattern. In these so-called dry processes, an expensive apparatus and a complicated operation are needed, and formation of a film takes time and hence the productivity is unsatisfactory.

On the other hand, in the case of an organic polymer material, a uniform and good coating film can be obtained by the simple and inexpensive wet painting method. Thus, investigations have been widely made on this material. However, the optical properties are unstable and variation thereof with time is large.

Under such circumstances, an optical material suitable for micro optical components, which is made of a highly stable inorganic material having a high refractive index and a notably high transparency to light having longer wavelengths than those of ultraviolet rays, has been eagerly demanded. Further, it has been eagerly demanded that a coating film can be prepared therefrom by a simple painting method without the need of the vacuum technique.

SUMMARY OF THE INVENTION

An object of the present invention is to provide not only a material for a micro optical component which can be formed into a uniform film having excellent optical properties by a simple and inexpensive wet painting method, but also an optical component, such as a thin-film wave guide, a micro lens, or a micro prism, obtained by processing the above-mentioned film.

In order to attain the above-mentioned object, the present invention provides a material for an optical component composed of polytungstic acid having peroxo groups, and an optical component using this material.

The above-mentioned polytungstic acid having peroxo groups can be formed into a uniform film by wet-painting and drying. An excellent optical component can be obtained by heat treating and patterning of said film.

Polytungstic acid having peroxo groups has the following properties.

(1) It is readily soluble in water and hence is formed into a flat, high-quality thin film having a high mechanical strength by the wet painting method (such as spin coating or spray coating).

(2) It can be photosensitized with an ultraviolet ray, an electron beam or an X-ray to bring about insolubilization reaction (see Japanese Patent Application No. 114,081/1985).

(3) It has a high refractive index, for example, $n_{6328Å}$ at a wavelength of 6328Å of 2 or higher.

(4) It is transparent to light having a longer wavelength than that of visible light and strongly absorbs ultraviolet rays.

By utilizing the above-mentioned properties, a thin film having a high refractive index and a remarkably high transparency (namely a reduced light transmission loss) can be formed by the easy painting method. B utilizing the insolubilization reaction of the material by irradiation with an ultraviolet ray, X-ray or an electron beam, a wave guide, a lens, etc. of the order of submicrons can be formed on an arbitrary substrate with a high accuracy at a temperature of 100° C. or lower, thereby attaining the object of the present invention.

The same results can be obtained from polytungstic acid having peroxo groups and containing carbon as a heteroatom.

In the present invention, since polytungstic acid having peroxo groups is used as a material for an optical component, a flat, homogeneous thin film having a high refractive index, a remarkably high transparency, and a reduced light transmission loss can be obtained. By processing this thin film, an optical component, such as a light wave guide, a lens or a prism, which has excellent properties and which is finely disposed on the substrate can be formed. An optical component of the present invention has at least part of its light path formed in the above-mentioned thin film.

DESCRIPTION OF THE PREFERRED EMBODIMENTS

Example 1

Figure 1:
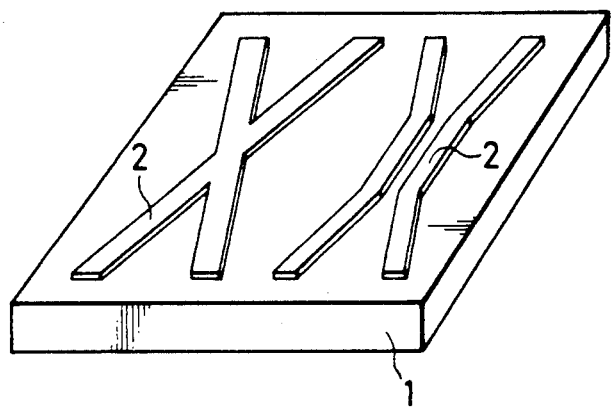
FIG. 1 is a perspective view of a micro optical component of one example of the present invention.

4 g of metallic tungsten (W) powder was placed in a beaker and 50 ml of a 15 wt.% aqueous solution of hydrogen peroxide (H$_2$O$_2$) was added thereto. H$_2$O$_2$ was gradually decomposed on the surface of the W powder to generate oxygen (O$_2$) After about 5 minutes, the reaction rate abruptly increased and the liquid temperature rose. About 2 minutes after, the liquid became yellow and transparent. Subsequently, most of excessive H$_2$O$_2$ was decomposed and removed by immersing a platinum net into the liquid. Thereafter, the liquid was evaporated to dryness at room temperature to obtain a pale yellow solid. As a result of elementary analysis, redox titration analysis and thermogravimetric analysis of this solid, it was found that the solid comprised a compound represented by the general formula of WO$_3$.xH$_2$O$_2$.yH$_2$O, wherein $0.4 \leq x \leq 0.7$ and $2 \leq y \leq 3$. The variation of the values of x and y as mentioned above is believed to be due to influences of the manner of removing excessive H$_2$O$_2$ present in the liquid, the variation of humidity in the air, and the like.

For example, polytungstic acid having peroxo groups is obtained as an amorphous solid having a molecular formula of H$_{10}$[H$_2$W$_{12}$O$_{37}$(O$_2$)$_3$(OOH)$_4$].nH$_2$O by dissolving metallic tungsten in an aqueous solution of hydrogen peroxide to form a yellow aqueous solution and evaporating the aqueous solution to dryness at room temperature to effect removal of water. In the above formula, ($O_2$) is an ion ($O_2^{2-}$) constituting a peroxo group, while (OOH) is an ion represented by ($OOH^-$), which is an anion formed by removing $H^+$ from hydrogen peroxide ($H O_2$), and n is within a range of 10 to 40 but typically about 20.

3 parts by weight of the obtained polytungstic acid having peroxo groups was dissolved in 2 parts of water to form a resist solution. The resist solution was applied to a glass substrate, a gallium arsenide wafer, or a silicon wafer by spin coating and dried to form a coating film having a thickness of about 1.8 μm. The refractive index of this film was 1.7 ($\lambda$=633nm). When the film was heat-treated at 110° C., the refractive index was 2.2. The transmission loss of laser beam ($\lambda$=633nm) was measured by using this thin film as a well-known wave guide. It was as remarkably low as 0.5 dB/cm or below.

Example 2

Polytungstic acid containing carbon as a heteroatom and having peroxo groups was prepared by the following method.

16 g of tungsten carbide was dissolved in 200 ml of 15 wt.% aqueous hydrogen peroxide. Insoluble and undissolved matters were removed by filtration to obtain a yellow aqueous solution. Excessive hydrogen peroxide was removed from the aqueous solution by immersing a platinum net in the solution. The resulting solution was dried at room temperature to 50° C. to obtain a yellow amorphous solid. As a result of elementary analysis, redox titration analysis, and thermogravimetric analysis of this substance, it was found that the substance was a compound represented by the general formula of $WO_3 \cdot xCO_2 \cdot yH_2O_2 \cdot zH_2O$, wherein $0.08 \leq x \leq 0.25$, $0.05 \leq y \leq 1.0$, and $2 \leq z \leq 3$. The broad values of x, y, and z are believed to be due to the manner of addition of aqueous hydrogen peroxide in obtaining a yellow aqueous solution, the manner of removing excessive hydrogen peroxide, and the variation of humidity in the air.

3 parts by weight of the obtained polytungstic acid containing peroxo groups was dissolved in 2 parts by weight of water to form a resist solution. The resist solution was applied to a glass substrate or a semiconductor wafer by spin coating and dried to obtain a thin film having a thickness of about 2.0 μm. Subsequently, this thin film was baked at 80° C. for 30 minutes. Thereafter, the thin film was exposed through a chromium mask to light from a 600W xenon mercury lamp at a distance of 50 cm from the mercury lamp for 1 minute. Since the exposed portion of the thin film was insolubilized, development was made using an aqueous solution of sulfuric acid having a pH value of 2 after light exposure to obtain a wave guide pattern (width of the wave guide: 5 to 100 μm) as shown in FIG. 1. In the figure, numeral 1 refers to a substrate, while numeral 2 refers to a wave guide. The refractive index of the wave guide comprising the exposed portion was about 2.0. When the transmission loss was measured by using this wave guide, it was favorably as very low as 0.2 dB/cm.

This thin film can be exposed with not only an ultraviolet ray but also an electron beam and an X-ray, and can form a pattern having a resolution of 0.1 μm.

Example 3

Figure 2:
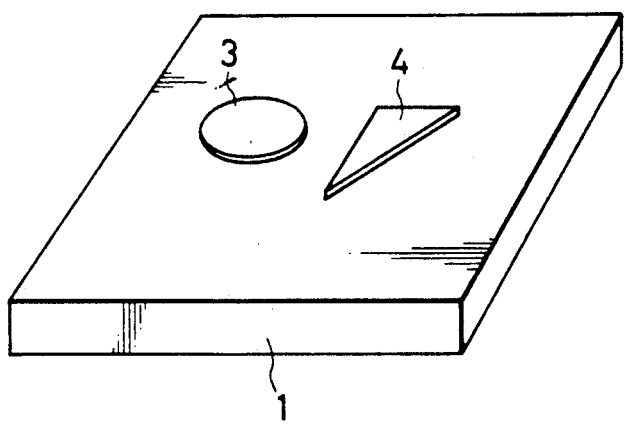
FIG. 2 is a perspective view of a micro optical component of another example of the present invention.

As shown in FIG. 2, micro lenses 3 and micro prisms 4 were formed on a substrate 1 in substantially the same manner as in Example 2 for formation of a wave guide pattern. As to the micro lenses, arbitrary ones having a NA (numerical aperture) of 0.1 to 0.5 could be formed in the case of lenses of 2 mm in aperture. It was possible to converge a ray of 1 mm in beam diameter (wavelength: 800 nm) into a spot light of 3 μm or less in diameter.

Among the above-mentioned lenses, one having a NA of 0.5 could be used to readily introduce a beam of semiconductor laser into an optical fiber. A beam emitted from a semiconductor laser could be formed into a parallel beam by using a lens having a NA of about 0.1.

As to micro prisms, the course of light could be bent rectangularly by using a rectangular prism. A prism spectroscope was prepared and laser beams having different wavelengths could be separated by using it.

Example 4

MoC, Ti, NbC, VC, or TaC was substituted for part (1 to 40%) of WC (tungsten carbide) and dissolved in hydrogen peroxide. A resist solution was prepared in the same manner as in Example 2 and a thin film was prepared therefrom. The thin film had similar exposure characteristics and micro optical components were readily formed therefrom.

Since the materials for optical components are inorganic materials in all of the above Examples, needless to say, the stabilities of optical properties are remarkably good when compared with those of organic polymer materials.

According to the present invention, the material for an optical component is polytungstic acid having a refractive index of 2 or more, which is readily formed into a thin film by a low-cost process such as spin coating and into a micro optical component having a low transmission loss with a high accuracy by the lithographic technique. Thus, not only a material for an optical IC and a material for a micro optical component but also an optical component using the same can be provided with a high performance.

What is claimed is:

1. An optical wave guide for an optical integrated circuit, said optical wave guide including a thin film comprising polytungstic acid having peroxo groups ($O_2^{2-}$), said thin film being disposed on a substrate and constituting a light path for said optical integrated circuit.

2. An optical wave guide as claimed in claim 1, wherein said polytungstic acid having peroxo groups is a compound represented by the general formula of $WO_3 \cdot xH_2O_2 \cdot yH_2O$, wherein $0.4 \leq x \leq 0.7$ and $2 \leq y \leq 3$.

3. An optical wave guide as claimed in claim 1, wherein said polytungstic acid having peroxo groups is a compound represented by a molecular formula of $H_{10}[H_2W_{12}O_{37}(O_2)_3(OOH)_4] \cdot nH_2O$, wherein n is within the range of 10 to 40.

4. An optical wave guide as claimed in claim 1, wherein said polytungstic acid having peroxo groups contains carbon as a heteroatom.

5. An optical wave guide as claimed in claim 4, wherein said polytungstic acid having a peroxo groups and containing carbon as a heteroatom is a compound represented by the general formula of $WO_3 \cdot xCO_2 \cdot yH_2O_2 \cdot zH_2O$, wherein $0.08 \leq x \leq 0.25$, $0.05 \leq y \leq 1$, and $2 \leq z \leq 3$.

6. An optical wave guide as claimed in claim 4, wherein said polytungstic acid is a compound wherein 1 to 40 atomic % of W is substituted with at least one element selected from the group consisting of Nb, Ti, Mo, Ta and V.

7. An optical wave guide as claimed in claim 1, wherein said polytungstic acid is a compound wherein 1 to 40 atomic % of W is substituted with at least one element selected from the group consisting of Nb, Ti, Mo, Ta, and V.

8. An optical wave guide as claimed in claim 1, wherein said substrate is made of a material selected from the group consisting of glass, gallium arsenide and silicon.

9. An optical wave guide as claimed in claim 1, wherein said polytungstic acid having peroxo groups has a refractive index of at least 2.

10. An optical wave guide as claimed in claim 1, wherein said light path is a light path for a laser beam.

11. A transparent optical wave guide for an optical integrated circuit, said wave guide being composed of a thin film of polytungstic acid having peroxo groups ($O_2^{2-}$), the thin film constituting a light path.

12. A transparent optical wave guide as claimed in claim 11, wherein said polytungstic acid having peroxo groups is a compound represented by the general formula of $WO_3 \cdot xH_2O_2 \cdot yH_2O$, wherein $0.4 \leq x \leq 0.7$ and $2 \leq y \leq 3$.

13. A transparent optical wave guide as claimed in claim 11, wherein said polytungstic acid having peroxo groups is a compound represented by a molecular formula of $H_{10}[H_2W_{12}O_{37}(O_2)_3(OOH)_4] \cdot nH_2O$, wherein n is within the range of 10 to 40.

14. A transparent optical wave guide as claimed in claim 11, wherein said polytungstic acid having peroxo groups contains carbon as a heteroatom.

15. A transparent optical wave guide as claimed in claim 14, whrein said polytungstic acid having peroxo groups and containing carbon as a heteroatom is a compound represented by the general formula of $WO_3 \cdot xCO_2 \cdot yH_2O_2 \cdot zH_2O$, wherein $0.08 \leq x \leq 0.25$, $0.05 \leq y \leq 1$, and $2 \leq z \leq 3$.

16. A transparent optical wave guide as claimed in claim 14, wherein said polytungstic acid having peroxo groups is a compound wherein 1 to 40 atomic % of W is substituted with at least one element selected from the group consisting of Ni, Ti, Mo, Ta and V.

17. A transparent optical wave guide as claimed in claim 11, wherein said polytungstic acid having peroxo groups is a compound wherein 1 to 40 atomic % of W is substituted with at least one element selected from the group consisting of Nb, Ti, Mo, Ta and V.

18. A transparent optical wave guide as claimed in claim 11, wherein said light path is a light path for a laser beam.

19. A transparent optical wave guide for an optical integrated circuit, the wave guide being composed of a thin film consisting essentially of polytungstic acid having peroxo groups ($O_2^{2-}$), the thin film being disposed on a substrate and constituting a light path for said optical integrated circuit.

20. A transparent optical wave guide as claimed in claim 19, whrein said light path is a light path for a laser beam.

21. An optical wave guide comprising a thin film of polytungstic acid having peroxo groups ($O_2^{2-}$), disposed on a substrate and having a thickness of at least 1.8 μm.

22. An optical wave guide as claimed in claim 21, wherein the wave guide has a width of 5-100 μm.

23. A transparent optical wave guide comprising a thin film of polytungstic acid having peroxo groups ($O_2^{2-}$), the thin film having a thickness of at least 1.8 μm.

24. A transparent optical wave guide as claimed in claim 23, wherein the wave guide has a width of 5-100 μm.

25. An optical wave guide as claimed in claim 1, wherein the polytungstic acid having peroxo groups is an amorphous solid.

26. An optical wave guide as claimed in claim 1, wherein the optical wave guide is a lens, said lens being composed of said thin film of polytungstic acid having peroxo groups ($O_2^{2-}$).

27. An optical wave guide as claimed in claim 1, wherein the optical wave guide is a prism, said prism being composed of said thin film of polytungstic acid having peroxo groups ($O_2^{2-}$).

28. A transparent optical wave guide as claimed in claim 11, wherein the polytungstic acid having peroxo groups is an amorphous solid.

29. A transparent optical wave guide as claimed in claim 11, wherein the transparent optical wave guide is a lens, said lens being composed of said thin film of polytungstic acid having peroxo groups ($O_2^{2-}$).

30. A transparent optical wave guide as claimed in claim 11, wherein the transparent optical wave guide is a prism, said prism being composed of said thin film of polytungstic acid having peroxo groups ($O_2^{2-}$).

31. A transparent optical wave guide as claimed in claim 19, wherein the polytungstic acid having peroxo groups is an amorphous solid.

32. A transparent optical wave guide as claimed in claim 19, wherein the transparent optical waveguide is a lens, said lens being composed of said thin film consisting essentially of polytungstic acid having peroxo groups ($O_2^{2-}$).

33. A transparent optical wave guide as claimed in claim 19, wherein the transparent optical wave guide is a prism, said prism being composed of said thin film of polytungstic acid having peroxo groups ($O_2^{2-}$).

34. An optical wave guide as claimed in claim 21, wherein the polytungstic acid having peroxo groups is an amorphous solid.

35. An optical wave guide as claimed in claim 21, wherein the optical wave guide is a lens, said lens being composed of said thin film of polytungstic acid having peroxo groups ($O_2^{2-}$).

36. An optical wave guide as claimed in claim 21, wherein the optical wave guide is a prism, said prism being composed of said thin film of polytungstic acid having peroxo groups ($O_2^{2-}$).

37. A transparent optical wave guide as claimed in claim 23, wherein the polytungstic acid having peroxo groups is an amorphous solid.

38. A transparent optical wave guide as claimed in claim 23, wherein the transparent optical wave guide is a lens, said lens being composed of said thin film of polytungstic acid having peroxo groups ($O_2^{2-}$).

39. A transparent optical wave guide as claimed in claim 23, whrein the transparent optical wave guide is a prism, said prism being composed of said thin film of polytungstic acid having peroxo groups ($O_2^{2-}$).

* * * * *